United States Patent [19]

Ando et al.

[11] 4,318,584
[45] Mar. 9, 1982

[54] IMAGE STABILIZED OPTICAL SYSTEM

[75] Inventors: Kunio Ando, Yono; Takemi Saito, Kawagoe; Seiji Toyama, Ageo; Syuichi Yamataka, Ibaragi, all of Japan

[73] Assignee: Fuji Photo Optical Co., Ltd., Saitama, Japan

[21] Appl. No.: 112,234

[22] Filed: Jan. 15, 1980

[30] Foreign Application Priority Data

Jan. 20, 1979 [JP] Japan .................................. 54-5806

[51] Int. Cl.³ ........................ G02B 27/32; G02B 23/00
[52] U.S. Cl. ......................................... 350/10; 350/16
[58] Field of Search ................................... 350/10, 16

[56] References Cited

U.S. PATENT DOCUMENTS

4,013,339  3/1977  Ando et al. ............................ 350/16
4,235,506  11/1980 Saito et al. ............................ 350/16

Primary Examiner—John K. Corbin
Assistant Examiner—Matthew W. Koren
Attorney, Agent, or Firm—Gerald J. Ferguson, Jr.; Joseph J. Baker

[57] ABSTRACT

A telescopic optical system composed of an objective, an eyepiece and an erect prism located between the objective and the eyepiece is provided with a reticle located on the focal plane of the objective. The objective, the eyepiece and the reticle are fixed to a casing of the telescopic optical system. The erect prism is capable of having its incident light optical axis and its emanating light optical axis aligned with each other and is rotatably mounted on the casing by means of gimbals provided with a rotor. The gimbals have two axes of rotation intersecting at right angle with each other and are located so that the two axes of the rotation are included in a plane which is perpendicular to the main optical axis of the telescopic optical system and passes through the middle point of the distance from the objective to the reticle.

5 Claims, 8 Drawing Figures

IMAGE STABILIZED OPTICAL SYSTEM

BACKGROUND OF THE INVENTION

1. Field of the Invention

This invention relates to an image stabilized optical system having a reticle, and more particularly to an optical system with a reticle provided with an image stabilizing means in which an image is stabilized with respect to the reticle.

2. Description of the Prior Art

There have been known various optical systems having a reticle disposed on the focal plane of an objective like a sighting telescope. By utilizing a scale on the reticle, the size of an object can be known when the distance to the object is known and vice versa.

There have also been known various optical systems with an image stabilizing means.

When a telescope or binoculars are supported by hands, the vibration of the hands is liable to transmit to the telescope or binoculars which results in vibration of the image viewed therethrough. Particularly when the optical instrument such as the telescope or the binoculars is carried and used in a vehicle like an aircraft or motorcar, the image is vibrated and the quality of the image viewed is lowered. This is because the optical axis of the optical instrument is vibrated and the angle of the emanating optical axis is fluctuated. The vibration transmitted to the optical system is amplified by the optical system to the degree in proportion to the magnification of the optical system.

In order to avoid the vibration of the image viewed through the optical instrument or focused in an optical instrument, there have been proposed various kinds of image stabilized optical instruments. Some of these instruments are disclosed in U.S. Pat. Nos. 3,473,861, 3,608,995, and 3,608,997, Japanese Patent Publication No. 52(1977)-23262 (U.S. patent application Ser. No. 300,528), and Japanese patent application No. 52(1977)-88145 (U.S. patent application Ser. No. 926,382).

These image stabilized optical instruments are mainly directed to stabilization of an image viewed therethrough. Therefore, when it is provided with a reticle disposed on the focal plane of the objective, the image formed on the reticle vibrates relative thereto when the optical instrument is vibrated. Accordingly, it becomes difficult to measure the size of the image by the scale, even if the image itself is stabilized.

SUMMARY OF THE INVENTION

The primary object of the present invention is, therefore, to provide an image stabilized optical system with a reticle in which the image is stabilized relative to the reticle.

The image stabilized optical system of the present invention comprises a telescopic optical system having an objective, an eyepiece, an erect prism located between the objective and the eyepiece, and a reticle located on the focal plane of the objective, said erect prism being capable of having its incident light optical axis and its emanating light optical axis aligned with each other. The objective, the eyepiece and the reticle are fixed to a casing of the telescopic optical system, and the erect prism is rotatably mounted on the casing by means of gimbals provided with a rotor having two axes of rotation intersecting at right angle with each other. The gimbals are oriented so that the two axes of rotation thereof are included in a plane which is in perpendicular to the main optical axis of the telescopic optical system and passes through the middle point of the total distance which is the sum of the optical distance from the objective to the entrance face of the erect prism, the mechanical distance from the entrance face to the exit face of the erect prism and the optical distance from the exit face of the erect prism to the reticle (i.e., the focal plane of the objective).

In one aspect of the present invention, an image stabilized binoculars comprises a pair of the above-described telescopic optical systems the main optical axes of which are in parallel to each other. In this case, only one of the telescopic optical systems is generally provided with a reticle. The main optical axis of the telescopic system will be defined in detail hereinafter.

DESCRIPTION OF THE PREFERRED EMBODIMENTS

Figure 1:
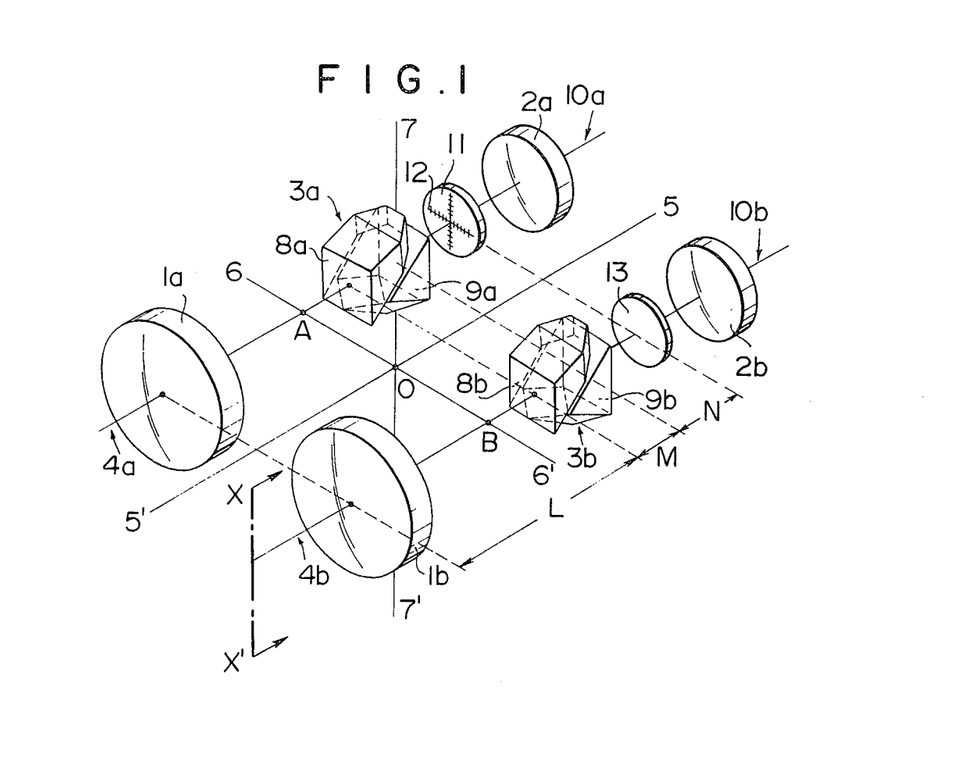
FIG. 1 is a perspective view showing the principal structure of the optical system employed in the image stabilized optical system in accordance with the present invention.

Now referring to FIG. 1, which is a perspective view showing the principal structure of the optical system employed in the image stabilized binoculars in accordance with an embodiment of the present invention, reference numerals 1a, 1b indicate a pair of objectives and 2a, 2b indicate a pair of eyepieces, respectively. Between the objectives 1a, 1b and the eyepieces 2a, 2b, there are provided a pair of erect prisms 3a and 3b each of which is capable of having its incident light optical axis and emanating light optical axis aligned with each other. One objective 1a, eyepiece 2a and erect prism 3a constitute a first telescopic optical system 10a, and the other objective 1b, eyepiece 2b and erect prism 3b constitute second telescopic optical system 10b. The first and second telescopic optical systems 10a and 10b constitute an optical system of binoculars.

A reticle 11 having a scale 12 is located at the focal plane of the objective 1a of the first telescopic optical system 10a. A transparent glass plate 13 having a thickness substantially equal to that of the reticle 11 is disposed at the focal plane of the objective 1b of the second telescopic optical system 10b. The glass plate 13 is not provided with a scale. Since the reticle with a scale may be inserted in either telescopic optical system, the glass plate 13 will also be referred to as a reticle hereinafter for the sake of simplification. In practical use of the binoculars, the glass plate 13 in one of the telescopic optical system may be omitted.

Figure 2:
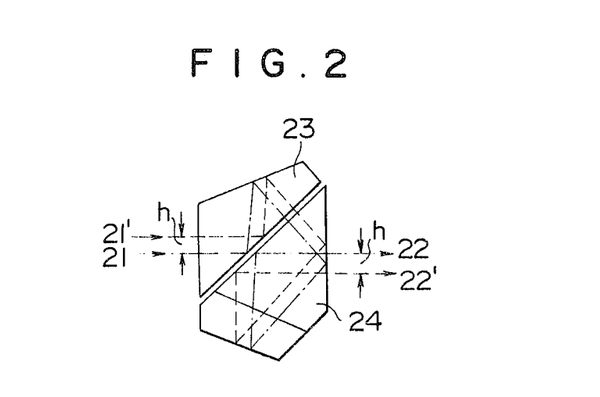
FIG. 2 is a side view showing an example of an erect prism, Schmidt prism, to be used in the optical system of the present invention.

As the erect prism which is capable of having its incident light optical axis and emanating light optical axis aligned with each other, a Schmidt's prism, an Abbe's prism or an erect prism of Bauern Fend, for example, can be used. The Schmidt's prism is shown in FIG. 2. As shown in FIG. 2, the Schmidt's prism comprises two prism blocks 23 and 24. The prism block 24 constitutes a roof prism. In the Schmidt's prism of such structure, the optical axis of the incident light ray 21 can be aligned with the optical axis of the emanating light ray 22 as shown in FIG. 2. In such an erect prism, a light ray 21' which enters the prism in parallel to the optical axis 21 and spaced upward therefrom by a distance h will emanate from the prism in parallel to the optical axis 22 and spaced downward therefrom by the distance h as indicated at 22' in FIG. 2. In this specification, the optical system of this invention will be described with the Schmidt's prism.

Again in FIG. 1, said objectives 1a, 1b, eyepieces 2a, 2b and the reticles 11, 13 are fixed to a casing of the binoculars, and said erect prisms 3a and 3b are mounted on the casing rotatably within a small angular range by means of gimbals which have two pairs of trunnions. The axes of rotation of the trunnions 6—6' and 7—7' are intersecting with each other at right angle. If the gimbals are held stationary and fixed to the casing, i.e., if said two erect prisms 3a and 3b are fixed with respect to the casing, the optical system shown in FIG. 1 can be regarded as a usual optical system of binoculars. In this specification, optical axes 4a, 4b of the respective telescopic optical systems 10a and 10b with said erect prisms 3a and 3b fixed relative to the casing of the optical instrument are defined as the main optical axes of the optical system.

It should be appreciated that the main optical axes 4a and 4b are parallel to each other. The gimbals are so oriented that the axis of rotation 6—6' of one pair of trunnions intersects with the main optical axes 4a and 4b at right angle at points A and B, and that the axis of rotation 7—7' of the other pair of trunnions extends in perpendicular to the plane which includes both the main optical axes 4a and 4b and intersects with a theoretical line 5 which is parallel to and equally spaced from the main optical axes 4a and 4b. The axes of rotation 6—6' and 7—7' intersect with each other at point O.

Further, the axes of rotation 6—6' and 7—7' are positioned so that each of said points A and B at which the plane including the axes 6—6' and 7—7' intersects with the main optical axes 4a and 4b falls on the middle point of the total distance S of the sum of the optical distance L from the objective (1a, 1b) to the incident face (8a, 8b) of the erect prism (3a, 3b), the mechanical distance M from the incident face (8a, 8b) to the emanating face (9a, 9b) of the erect prism (3a, 3b), and the optical distance N from the emanating face (9a, 9b) of the erect prism (3a, 3b) to the reticle (11, 13) (S=L+M+N). As described above, the reticles 11 and 13 are located at the respective focal planes of the objectives 1a and 1b. Actually, the objective (1a, 1b) comprises a group of lenses having a thickness. Accordingly, exactly, the points A and B should respectively fall on the middle point of the total distance of the sum of the optical distance L from the rear principal plane (nodal plane) of the objective to the incident face of the erect prism, the mechanical distance M from the incident face to the emanating face of the erect prism, and the optical distance N from the emanating face of the erect prism to the reticle.

The rear principal plane of the objective referred to in this specification is defined with respect to a focusing point for parallel light rays incident to the objective from left to right in FIG. 1. As is well known in the art, the principal plane of the objective will coincide with the nodal plane thereof, if the objective is in the atmosphere of air.

The casing of the binoculars, the gimbals and a rotor are not shown in FIG. 1 for the sake of simplification of the drawing. These elements will be described hereinafter referring to a preferred embodiment of the present invention.

By supporting the erect prisms 3a and 3b on the gimbals so that the erect prisms 3a and 3b are rotatable within a small angular range with respect to the casing of the optical system about the axes of rotation 6—6' and 7—7' and by mounting the rotor to the gimbals, the erect prisms 3a and 3b can always take their original positions even if the casing is vibrated or accidentally moved, whereby the angle of the optical axis of the emanating light of the optical system is stabilized, and deterioration of the image viewed and vibration of the image relative to the scale on the reticle are prevented as will be described in greater detail hereinbelow.

Figure 3:
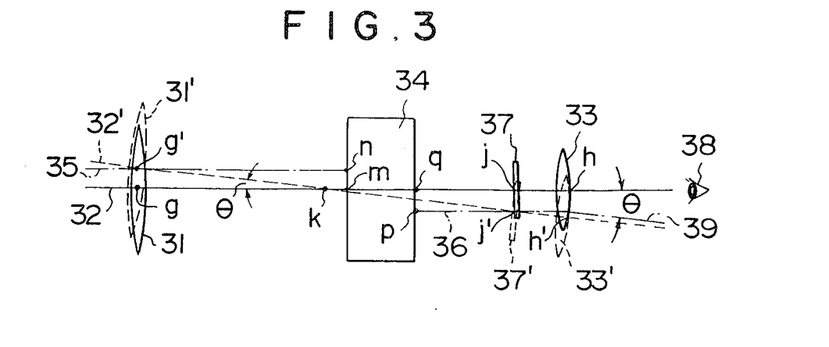
FIG. 3 is a longitudinal view along one optical axis of the optical system as shown in FIG. 1 for explaining the principle of this invention.

FIG. 3 is a diagramatic representation corresponding to the cross section taken along line X—X' of FIG. 1 for illustrating the principle in that the optical axis is stabilized with respect to the vibration in the vertical direction or the direction of the axis 7—7' of the optical system shown in FIG. 1 and the vibration of the image relative to the scale of the reticle is prevented. Between an objective lens 31 and an eyepiece 33 is provided an erect prism 34 which has its incident light optical axis and its emanating light optical axis on a common straight line aligned with the optical axis 32 of the objective lens 31. Further, a reticle 37 is provided on the focal plane of the objective lens 31. In such an optical system, light rays incident into the objective lens 31 in parallel to the optical axis 32 emanate from the eyepiece 33 in parallel to the optical axis 32 and are viewed with an eye 38. Assuming that the optical axis 32 is tilted about a point K by an angle $\theta$ to the inclined axis 32', the point K representing the position of the axis of rotation 6—6' of the gimbals in FIG. 1 to compensate for the vertical component of the vibration, the objective lens 31 is moved to the displaced objective lens 31', the eyepiece 33 is moved to the displaced eyepiece 33' and the reticle 37 is moved to the displaced reticle 37'. The principal point g of the objective lens 31 is moved to the displaced principal point g', the principal point h of the eyepiece 33 is moved to the displaced principal point h' and the center j of the reticle 37 is moved to the displaced center j'. However, the erect prism 34 is not moved and stays still in its original position by the effect of said gimbals on which it is mounted. Further, it is assumed that the eye 38 also stays still since the eye 38 is independent of the telescopic system.

Therefore, the light ray 35 parallel to the original optical axis 32 and passing through the displaced principal point g' of the displaced objective lens 31' advances in parallel to the original optical axis 32 after passing through the displaced objective lens 31' and enters the erect prism 34 at an entrance point n apart from the entrance point m of the original optical axis 32 by a distance $\overline{mn}$. The light ray 35 which enters the erect prism 34 at the entrance point n emanates from the erect prism 34 at an exit point p downwardly apart from an exit point q of the original optical axis 32 by a distance $\overline{qp}$ which is equal to the distance $\overline{mn}$ based on the effect of the erect prism and advances in parallel to the original optical axis 32 as indicated at 36. Accordingly, the light ray 32′ which enters the displaced objective lens 31′ in parallel to the original optical axis 32 is focused at a point on the optical axis of the light ray 36.

Therefore, by making the distance $\overline{jj'}$ from the original center j of the reticle to the displaced center j′ equal to the distance $\overline{gg'}$ from the original principal point g of the objective lens 31 to the displaced principal point g′, the distance $\overline{jj'}$ can be made equal to the distance $\overline{qp}$ (∵ $\overline{qp}=\overline{mn}=\overline{gg'}$). If the distance $\overline{jj'}$ is equal to the distance $\overline{qp}$, the position of the image relative to the reticle 37 would not be moved, even if the optical axis 32 is inclined when the telescopic optical system is vibrated. In order to make the distance $\overline{jj'}$ equal to the distance $\overline{gg'}$, the center of the inclination of the casing to which the objective lens 31 and the teticle 37 are fixed, i.e. said point K representing the position of the axis of rotation 6—6′ of the gimbals on which the erect prism is mounted, should be at the middle point of the distance from the principal point g of the objective lens 31 to the center j of the reticle 37 ($\overline{gk}=\overline{kj}$).

As described above, the eyepiece 33 is also fixed to the casing of the telescopic optical system. Accordingly, when the objective lens 31 and the reticle 37 are inclined by an angle θ, the eyepiece 33 is inclined by the same angle, and the principal point h of the eyepiece 33 is moved to the displaced principal point h′. Therefore, the optical axis 39 of the light ray emanating from the displaced eyepiece 33 is inclined by the angle θ with respect to the main optical axis 32. In other words, the emanating direction of the light ray emanating from the eyepiece 33 is fluctuated by the angle θ. As is well known in the art, in a usual telescopic optical system without an image stabilizing means, the emanating direction of the light ray emanating from the eyepiece when the telescopic optical system is tilted by an angle θ is defined as (M-1)θ wherein M represents the magnification of the telescopic optical system. Thus, in the telescopic optical system in accordance with the present invention, deterioration in quality of the view observed therethrough will be reduced to θ/(M-1)θ = 1/(M-1) in comparison with the telescopic optical system without an image stabilizing means. For example, the degree of deterioration in quality of the view observed through the telescopic optical system of the present invention is 1/9 of that of the telescopic optical system without an image stabilizing means when the magnification M is 10. Since the first and second telescopic optical systems 10a, 10b in the optical system of FIG. 1 are mounted on the common trunnions the axes of which are represented by 6—6′, the image viewed through each telescopic optical system can be stabilized and fixed relative to the reticle in quite the same manner as described above referring to FIG. 3.

In case that either the optical distance from the objective lens to the incident face of the erect prism or the optical distance from the emanating face of the erect prism to the reticle is different from its mechanical distance, the point K or the axis 6—6′ of the gimbals should be positioned on the middle point of the total distance of the sum of the optical distance from the objective lens to the incident face of erect prism, the mechanical distance from the incident face the emanating face of the erect prism and the optical distance from the emanating face to the reticle.

Figure 4:
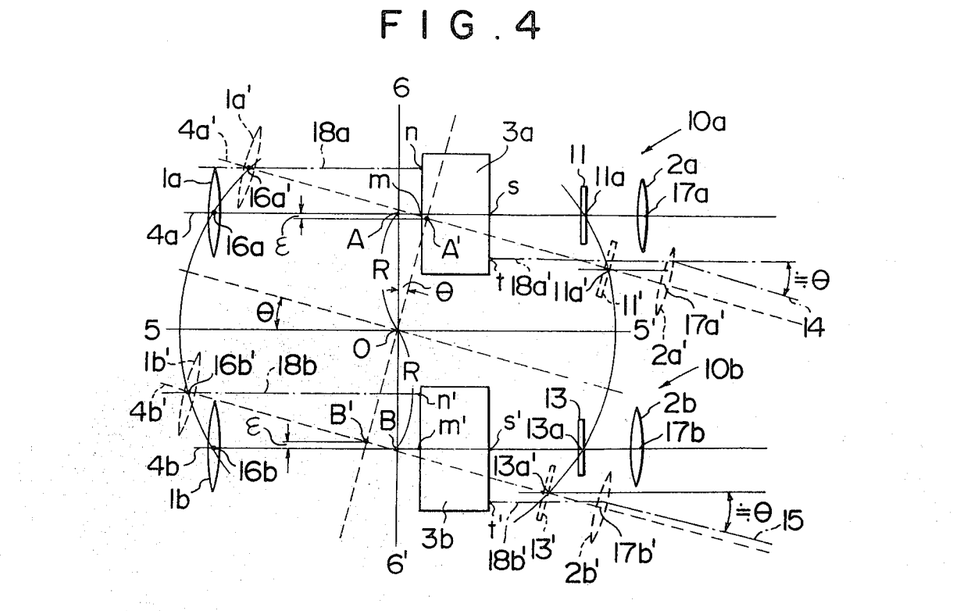
FIG. 4 is a plan view of FIG. 1 for explaining the principle of this invention.
Figure 5:
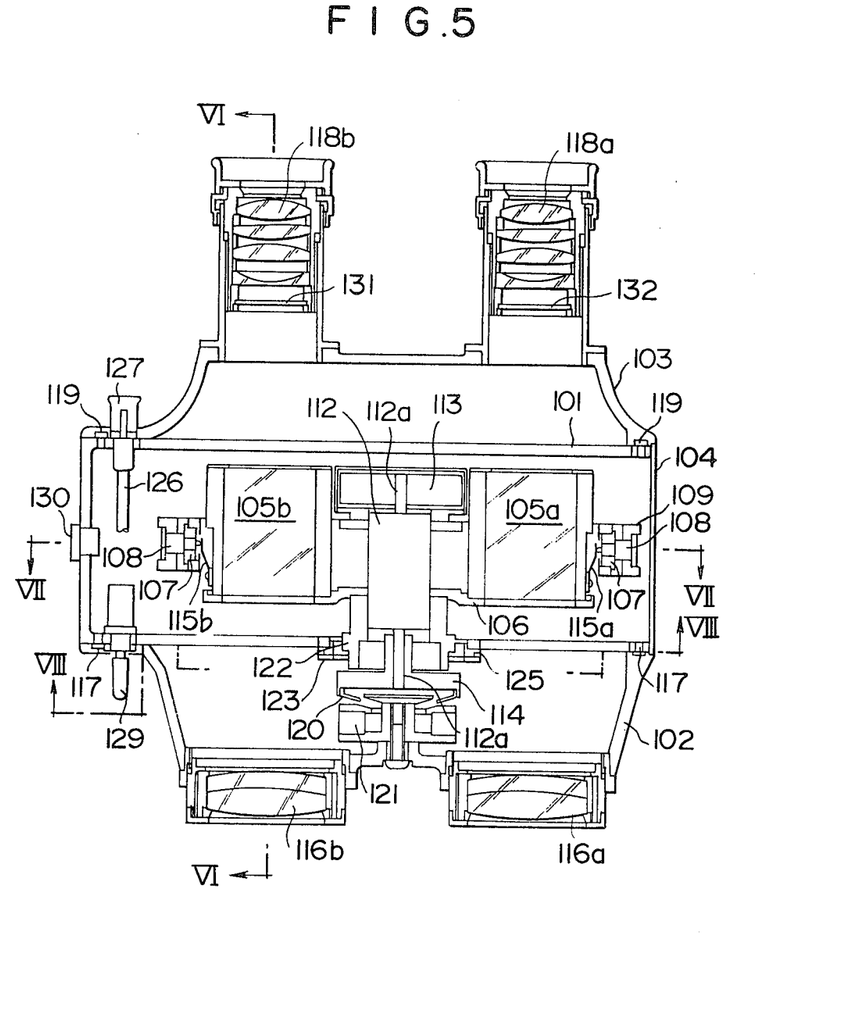
FIG. 5 is a horizontal sectional view of an embodiment of the present invention applied to binoculars.
Figure 6:
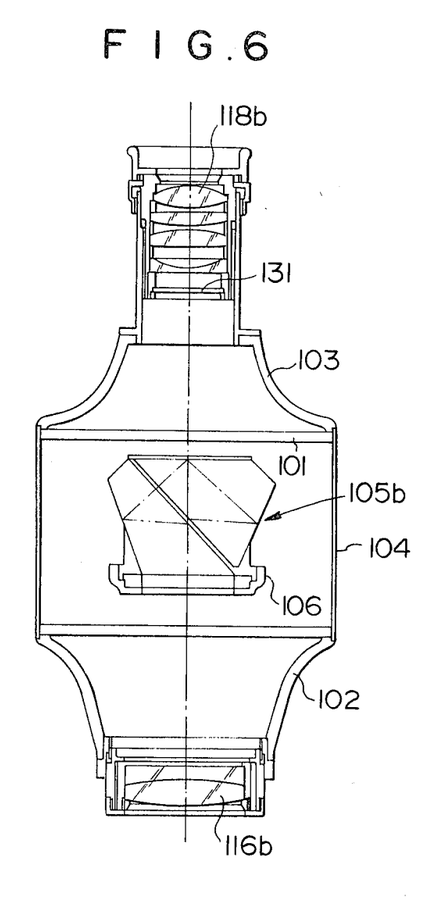
FIG. 6 is longitudinal sectional view of the binoculars taken along the line VI–VI of FIG. 5.

FIG. 4 is a plan view for explaining the principle in that the image is stabilized with respect to the vibration in the horizontal direction or the direction of the axis 6—6′ of the optical system shown in FIG. 1 and the vibration of the image relative to the reticle is prevented. In FIG. 4, objective lenses, erect prisms, reticles and eyepieces which constitute a pair of telescopic optical systems are indicated at the same reference numerals as those used in FIG. 1.

In FIG. 4, when the optical system is inclined in the horizontal direction about said point O or the axis 7—7′ of the gimbals in a horizontal plane by an angle θ, the erect prisms 3a and 3b are not moved and stay still in their original position by the effect of the gimbals on which it is mounted. However, the objective lenses 1a, 1b, the eyepieces 2a, 2b and the reticles 11, 13 are respectively moved to the positions 1a′, 1b′, 2a′, 2b′, 11′ and 13′. The optical axis 4a′ of the displaced objective lens 1a′ and the displaced eyepiece 2a′ is inclined at the angle θ with respect to the original main optical axis 4a, and the optical axis 4b′ of the displaced objective lens 1b′ and the displaced eyepiece 2b′ is inclined at the angle θ with respect to the original main optical axis 4b. Thus, the principal points 16a, 16b of the objective lenses 1a, 1b are respectively moved to the displaced principal points 16a′, 16b′ and the principal points 17a, 17b of the eyepieces 2a, 2b are respectively moved to the displaced principal points 17a′, 17b′. Accordingly, said points A and B at which the axis 6—6′ of the gimbals intersects with the main optical axis 4a and 4b respectively are moved to the displaced intersecting points A′ and B′, respectively. The point A is moved downward in FIG. 4 by a distance ε with respect to the original main optical axis 4a, and point B is moved upward by the distance ε with respect to the original main optical axis 4b. The amount of the displacement or the value of ε can be represented by the following formula wherein R represents the distance between the point O and the point A or B.

$$\epsilon = R(1-\cos\theta)$$

The light ray 18a parallel to the original main optical axis 4a of the telescopic optical system 10a and passing through the displaced principal point 16a′ of the displaced objective lens 1a′ advances in parallel to the original main optical axis 4a after passing through the displaced objective lens 1a′ and enters the erect prism 3a at an entrance point n apart from the entrance point m of the original main optical axis by a distance $\overline{mn}$. The light ray 18a emanates from the erect prism 3a at an exit point t apart from the exit point S of the original main optical axis 4a by a distance $\overline{st}$ equal to the distance $\overline{mn}$ and advances in parallel to the original main optical axis 4a as indicated at 18a′. The light ray 18a′ is focused on the displaced reticle 11′. At this time, the center 11a of the reticle 11 is moved to the position 11a′. Accordingly, an image formed on the reticle 11 is moved relative to the reticle 11 by a distance X which is represented by the following formula.

$$X \times 2\epsilon/\cos\theta$$

When θ is small, X is substantially equal to 2ε. Similarly, the light ray 18b parallel to the original main optical axis 4b of the telescopic optical system 10b and passing through the displaced principal point 16b' of the displaced objective lens 1b' *advances in parallel to the original main optical axis 4b* after passing through the displaced objective lens 1b' and enters the erect prism 3b at an entrance point n' apart from the entrance point m' of the original main optical axis by a distance $\overline{m'n'}$. The light ray 18b emanates from the erect prism 3b at an exit point t' apart from the exit point S' of the original main optical axis 4b by a distance $\overline{s't'}$ equal to the distance $\overline{m'n'}$ and advances in parallel to the original main optical axis 4b as indicated at 18b'. The light ray 13b' is focused on the displaced reticle 13'. At this time, the center 13a of the reticle 13 is moved to the position 13a'. Accordingly, an image formed on the reticle 13 is moved relative to the reticle 13 by a distance X' which is represented by the following formula.

$$X' = 2\epsilon/\cos\theta$$

When $\theta$ is small, X' is substantially equal to $2\epsilon$. The directions of the movement of the image relative to the respective reticles in the telescopic optical systems 10a and 10b are opposite to each other. However, since one reticle 13 is not provided with a scale, there is no fear of the displacement of the image relative to the scale on the reticle being viewed doubled.

Generally, the vibration in the vertical direction shares the major portion in the vibration imparted to the optical instrument such as binoculars. Further, the amount of the movement of the image relative to the reticle which is represented by the formula $2\epsilon = R(1-\cos\theta)$ is sufficiently small where R is the distance between said point O and the point A or B. Accordingly, the movement of the image relative to the reticle in the horizontal direction is practically negligible.

When the objective lens and the reticle are inclined by an angle $\theta$, the eyepieces 2a and 2b are respectively inclined by the angle $\theta$. Accordingly, the emanating direction of the light ray emanating from the eyepiece is basically fluctuated by the angle $\theta$. More exactly, the emanating direction is fluctuated by the angle $\theta + (2\epsilon/f'e)$, wherein f'e represents the focal length of the eyepiece.

However, as described above with reference to FIG. 3, in the optical system in accordance with the present invention, deterioration in quality of the view can be reduced to 1/(M−1) in comparison with the optical system without an image stabilizing system. Accordingly, the amount of $2\epsilon/f'e$ is negligible and the image can be satisfactorily stabilized.

When applying the present invention to a telescope comprising a single set of an objective and an eyepiece, it is desirable to use gimbals employing an electric motor with a rotor having a hollow middle portion to permit passage of light ray therethrough to make the distance R between the point O and the point A or B in FIG. 4 zero as shown in Japanese Patent Publication Nos. 52(1977)-11381 and 52(1977)-22544. In this case, the principle described with reference to FIG. 3 can be applied to both the horizontal and the vertical vibrations and accordingly the image is stabilized for both vibrations.

Now, binoculars in accordance with an embodiment of the present invention will be described in detail referring to FIGS. 5 to 8.

The binoculars of this embodiment has a casing consisting of a casing 101 for mounting thereon gimbals on which a pair of erect prisms 105a and 105b are mounted, a casing 102 for mounting thereon a pair of objectives 116a and 116b, a casing 103 for mounting thereon a pair of eyepieces 118a and 118b and a cover member 104. The pair of erect prisms 105a and 105b are fixed to the inner ring 106 of the gimbals. The inner ring 106 is rotatably mounted on the outer ring 109 of the gimbals through a pair of bearings 107 and a pair of shafts 108. The outer ring 109 is rotatably mounted on the casing 101 through a pair of bearings 110 and a pair of shafts 111 (see FIG. 7). The inner and outer rings 106 and 109 of the gimbals are rotatable about the respective shafts 108 and 111 which extend perpendicular to each other. Accordingly, the erect prisms 105a and 105b are rotatable relative to the casing 101.

On the inner ring 106 is mounted an electric motor 112 at the intersecting point of the shafts 108 and 111 which motor has a rotor shaft 112a extending perpendicular to the shafts 108 and 111. On opposite ends of the rotor shaft 112a are mounted a pair of rotors 113 and 114.

The shafts 108 and 111 have a structure which permits flow of an electric current through its interior and the inner ends of the shafts 108 and 111 are in contact with a contact 115a and 115b, respectively, with a small pressure to provide an electric current to the motor 112 without adversely affecting the movement of the gimbals. The outer ends of the shafts 108 and 111 are connected to an external power source through a switch 129 and a connector 130 by way of a lead wire (not shown).

Said pair of objectives 116a and 116b are fixed to the casing 102 which is in turn fixed to the casing 101 at a predetermined position determined by pins 117. Said pair of eyepieces 118a, 118b and a pair of reticles 131, 132 are fixed to the casing 103 which is in turn fixed to the casing 101 at a predetermined position determined by pins 119. It should be appreciated that one of the reticles 131 and 132 is not provided with a scale as mentioned above.

An annular aluminum member 120 is fixed to the rotor 114. The aluminum member 120 cooperates with a permanent magnetic member 121 fixed to the casing 102 to cause precession due to the effect of eddy-current brake therebetween, thereby permitting the gimbals to move with the casing 102 when the casing 102 is panned slowly to follow the object to be viewed.

Thus, if the casing 102 is swung by a long distance, for example, to direct the objectives 116a and 116b upward, the aluminum member 120 tries to keep its position by the inertia of the rotor 114. Accordingly the magnetic member 121 is moved upward relative to the aluminum member 120. At this time, the magnetic flux of the magnetic member 121 will pass through only the upper part of the aluminum member 120 and the influence of the magnetic flux to the lower part of the aluminum member 120 is relatively weakened since the lower part is farther from the magnetic member 121 than the upper portion. As is well known, when a magnetic flux passes through a conductor in motion, an eddy-current is induced in the conductor. When the eddy-current is induced, an eddy-current brake is effected upon the moving conductor in the direction to reduce the eddy-current. Therefore, when the casing 102 is swung upward, the aluminum member 120 is moved laterally and consequently the rotor shaft 112a follows the casing 102 under the force of precession caused by the effect of the eddy-current brake.

The binoculars of this embodiment further includes a caging mechanism for holding the gimbals. The caging mechanism comprises three claws 123, ring 125 and spring 124 (see FIG. 8). The three claws 123 hold an annular member 122 provided on the exterior surface of said electric motor 112 under the force of the spring 124. Three stud pins 125a fixed to the ring 125 are engaged with recesses formed on the side surface of the claws 123. The ring 125 is rotatable and includes a projection 125b. When a button 127 projecting outside the casing of the binoculars is depressed, the projection 125b of the ring 125 is pushed by a flexible cable 126 and the ring 125 is rotated in the counterclockwise direction, whereby the claws 123 are moved to release the annular member 122 by way of engagement of the stud pins 125a and the recesses. Thus, the caging mechanism can be operated from outside the casing.

Figure 7:
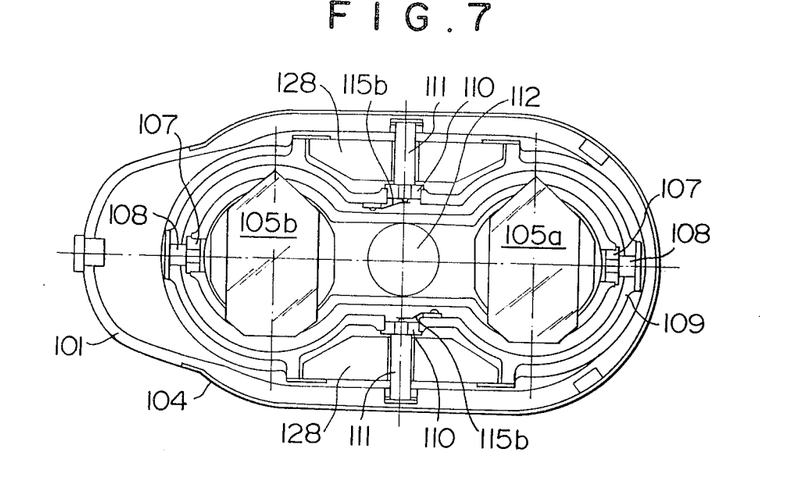
FIG. 7 is a cross sectional view of the binoculars taken along the line VII–VII of FIG. 5.
Figure 8:
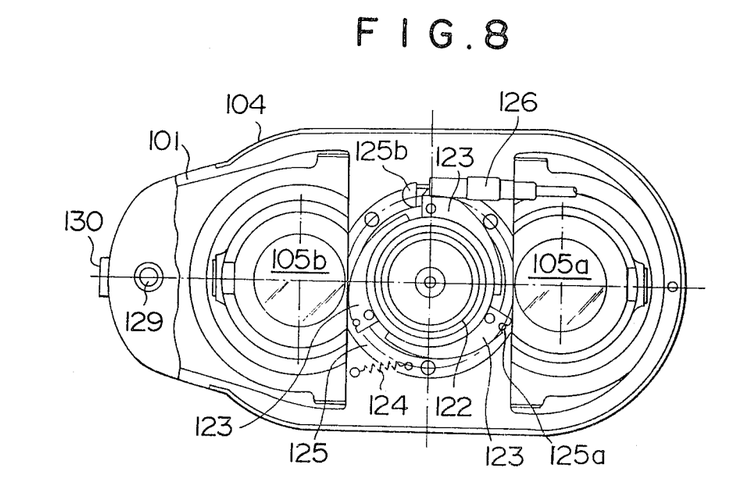
FIG. 8 is a cross sectional view of the same taken along the line VIII–VIII of FIG. 5.

Members indicated at 128 in FIG. 7 are dampers containing oil therein for absorbing impacts.

We claim:

1. An image stabilized optical system comprising a telescopic optical system consisting of an objective, an eyepiece, an erect prism located therebetween and a reticle located on the focal plane of the objective characterized in that the objective, the eyepiece and the reticle are fixed to a casing of the image stabilized optical system, and the erect prism is capable of having its incident light optical axis and its emanating light optical axis aligned with each other and is mounted on the casing by means of gimbals provided with a rotor and two axes of rotation intersecting at right angle with each other, the two axes of rotation of the gimbals being included in a plane which is in perpendicular to the main optical axis of the telescopic optical system and passes through the middle point of the total distance which is the sum of the optical distance from said objective to the entrance face of said erect prism, the mechanical distance from the entrance face to the exit face of said erect prism and the optical distance from the exit face to the reticle.

2. An image stabilized optical system as defined in claim 1 wherein the axis of rotation of the rotor of said gimbals passes through the intersection of said two axes of rotation of the gimbals and is in perpendicular to the two axes of rotation of the gimbals.

3. An image stabilized optical system as defined in claim 2 wherein said rotor is driven by an electric motor.

4. An image stabilized optical system as defined in claim 1 wherein a caging means is provided for preventing the erect prisms from rotating with respect to the casing of the optical system.

5. An image stabilized optical system in which a pair of telescopic optical systems each comprising an objective, an eyepiece and an erect prism located therebetween are arranged so that the main optical axes of said pair of telescopic optical systems are in parallel to each other characterized in that a reticle is provided on the focal plane of the objective of one of the telescopic optical systems, the objectives, the eyepieces and the reticle are fixed to a casing of the image stabilized optical system, and the erect prism is capable of having its incident light optical axis and its emanating light optical axis aligned with each other and is mounted on the casing by means of gimbals provided with a rotor and two axes of rotation intersecting at right angle with each other, the two axes of rotation of the gimbals being included in a plane which is in perpendicular to the main optical axes of the telescopic optical systems and passes through the middle point of the total distance which is the sum of the optical distance from said objective to the entrance face of said erect prism, the mechanical distance from the entrance face to the exit face of said erect prism and the optical distance from the exit face to the reticle.

* * * * *